US010257083B2

(12) United States Patent
Wang et al.

(10) Patent No.: US 10,257,083 B2
(45) Date of Patent: Apr. 9, 2019

(54) FLOW CACHE BASED MECHANISM OF PACKET REDIRECTION IN MULTIPLE BORDER ROUTERS FOR APPLICATION AWARENESS

(71) Applicant: Cisco Technology, Inc., San Jose, CA (US)

(72) Inventors: Alan Xiao-rong Wang, Shanghai (CN); Dapeng Liu, Shanghai (CN); Yu Zhang, Shanghai (CN); Gaofeng Tao, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 14/472,469

(22) Filed: Aug. 29, 2014

(65) Prior Publication Data

US 2016/0065455 A1 Mar. 3, 2016

(51) Int. Cl.
*H04L 12/701* (2013.01)
*H04L 12/721* (2013.01)
(Continued)

(52) U.S. Cl.
CPC .............. *H04L 45/38* (2013.01); *H04L 45/04* (2013.01); *H04L 45/20* (2013.01); *H04L 47/2441* (2013.01); *H04L 47/2475* (2013.01)

(58) Field of Classification Search
CPC ..... H04L 61/2592; H04L 45/00; H04L 45/54; H04L 45/58; H04L 45/66; H04L 45/74; H04L 45/742; H04L 45/745
(Continued)

(56) References Cited

U.S. PATENT DOCUMENTS

| 2003/0026241 A1* | 2/2003 | Ono | H04L 45/04 370/349 |
| 2003/0067880 A1* | 4/2003 | Chiruvolu | H04J 14/0227 370/237 |

(Continued)

OTHER PUBLICATIONS

"Interchassis Asymmetric Routing Support for Zone-Based Policy Firewalls," Security Configuration Guide: Zone-Based Policy Firewall, Cisco IOS Release 15M&T, http://www.cisco.com/en/US/docs/ios-xml/ios/sec_data_zbf/configuration/15-mt/sec-data-asym-zbf.html, Dec. 21, 2012, 22 pages.

(Continued)

*Primary Examiner* — Andrew W Chriss
*Assistant Examiner* — Kenan Cehic
(74) *Attorney, Agent, or Firm* — Meunier Carlin & Curfman LLC

(57) ABSTRACT

Techniques whereby a LAN-side border router observes all packets of an application flow from both directions so that the application recognition performed on the LAN-side border router functions properly. A border router may implement flags in a flow cache to indicate whether the border router is the LAN-side border router and/or a WAN-side border router for an application flow. As packets are received at a border router at either the LAN interface or WAN interface, the flags associated with packet's application flows are examined to determine if the border router is the LAN-side border router for the application flow. If so, then application recognition and routing control may be performed. If not, the packet may be redirected to another border router that may be the LAN-side border router or the WAN-side border router for the application flow to insure that border router observes the packet.

20 Claims, 13 Drawing Sheets

(51) Int. Cl.
*H04L 12/851* (2013.01)
*H04L 12/859* (2013.01)
*H04L 12/715* (2013.01)
*H04L 12/733* (2013.01)

(58) Field of Classification Search
USPC .............................................. 370/389, 401
See application file for complete search history.

(56) References Cited

U.S. PATENT DOCUMENTS

| | | | | |
|---|---|---|---|---|
| 2007/0027995 | A1* | 2/2007 | Hahn | H04L 29/12283 709/230 |
| 2013/0195115 | A1* | 8/2013 | Timm | H04L 29/12028 370/401 |
| 2015/0215201 | A1* | 7/2015 | Nakash | H04L 45/28 370/218 |
| 2015/0271067 | A1* | 9/2015 | Li | H04L 45/50 370/392 |
| 2015/0358232 | A1* | 12/2015 | Chen | H04L 45/72 370/392 |

OTHER PUBLICATIONS

Citrix® NetScaler Clustering Guide, https://www.citrix.com/content/dam/citrix/enus/documents/downloads/netscaler-adc/citrix_netscaler_clustering_guide_v2.pdf, Jul. 19, 2012, 67 pages.

Cisco Wide Area Application Service AppNav Module, http://www.cisco.com/c/en/us/products/collateral/routers/wide-area-application-services-waas-software/ga_c67-704965, Dec. 23, 2013, 3 pages.

"Classifying Network Traffic Using NBAR," QoS: NBAR Configuration Guide, http://www.cisco.com/en/US/docs/ios-xml/ios/qos nbar/configuration/15-2ml/ClassifyingNetwork_Traffic_Using_NBAR.html#GUID-3E6E1B36-CBC4-456E-9473-2DC678CAB434, Nov. 20, 2011, 36 pages.

* cited by examiner

FLOW CACHE BASED MECHANISM OF PACKET REDIRECTION IN MULTIPLE BORDER ROUTERS FOR APPLICATION AWARENESS

TECHNICAL FIELD

The present disclosure relates to management of application flows between networking devices.

BACKGROUND

In a datacenter, application performance-based WAN path optimization is often employed to optimize the cloud-to-cloud or cloud-to-Internet communication. In such a deployment, a central Policy Server (PS) typically collects performance measures of Traffic Class (TC) and WAN Exit link-usage reported by Border Routers (BR) under its control. According to the collected statistics, the Policy Server makes routing decision for each TC based on its policy and downloads the decisions to all BRs. For example, the routing decision for each TC is normally a routing path, which consists of a chosen WAN and a next-hop.

Border Routers perform routing control (RC), which may be regarded as a three-staged action applied to LAN-to-WAN packets on a per-packet basis. The stages include "identification," which refers to recognition of application type (i.e., Application Recognition (AR)); "Lookup," which refers to classifying the packet to a TC according to the recognized application type and L3 information, and retrieving the corresponding action from the policy table downloaded by Policy Server; and "Control," which refers to executing the retrieved action against the packet. The action is normally either forwarding the packet out of the current BR's WAN or redirecting the packet to a neighbor border router from which the packet is forwarded to the WAN. Routing Control attempts to insure that the application's performance conforms to the predefined policy. However, to perform the above, the application recognition process has to observe both directions of a flow, as stateful classification may fail for asymmetric flows. In an application recognition context, asymmetric flows are the flows in which different packets of the flow go through different routers, where packets flow through different routers in different directions.

DESCRIPTION OF EXAMPLE EMBODIMENTS

Overview

The methods, apparatus and software described herein utilize techniques that insure that a LAN-Side border router observes all packets of an application flow from both directions so that the application recognition performed on the LAN-Side border router functions properly. Because an application flow's LAN-Side border router can see all LAN-to-WAN packets of the flow, it will be able to observe all WAN-to-LAN packets as well. A set of rules may be used to regulate WAN-to-LAN packet redirection between border routers. Also, a particular application flow, only its LAN-Side border router needs to do the application recognition, as such the present disclosure provides a method that reduces unnecessary application recognition on other border router to save system resources.

Example Embodiments

Figure 1:
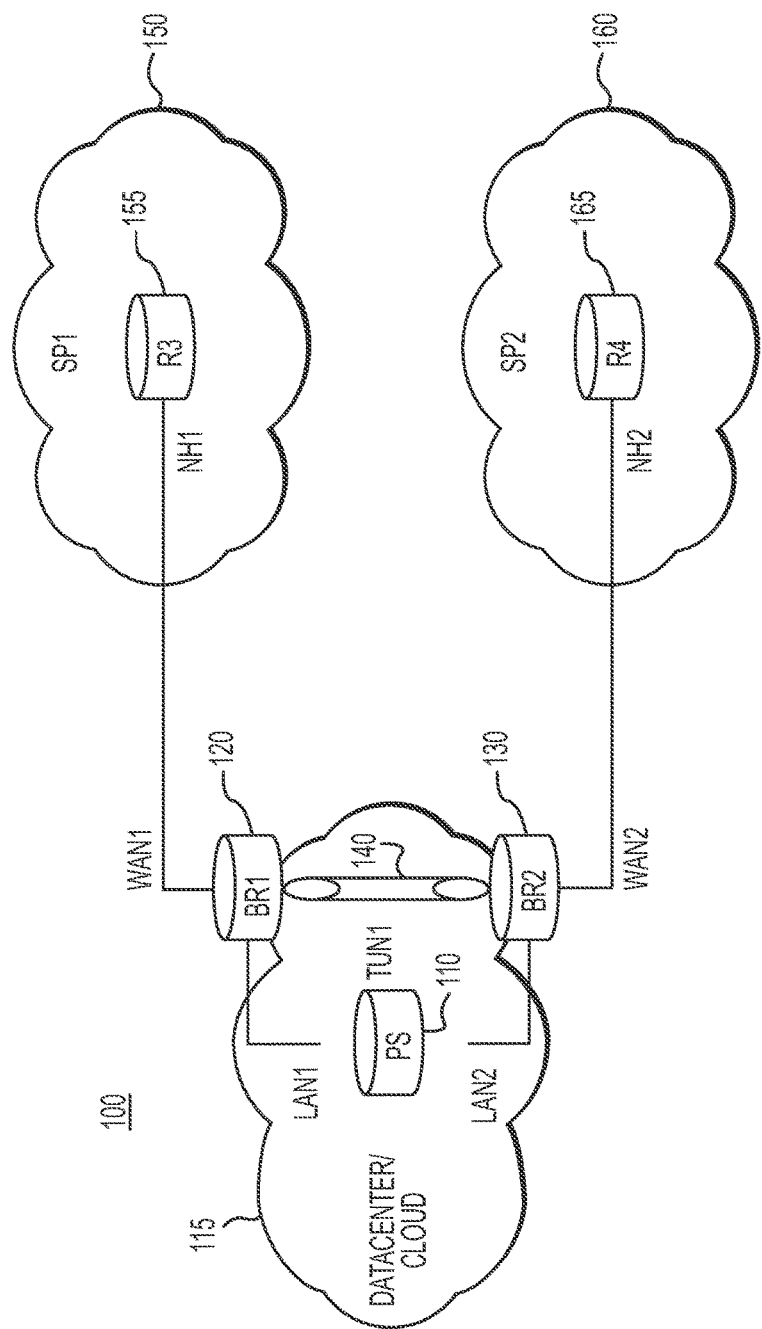
FIG. 1 is an example network topology including a policy server and multiple border routers suitable for implementing the techniques described herein.

Techniques are provided herein for managing traffic class in a network environment. An example network topology (hereinafter referred to as a "network") 100 is shown in FIG. 1. A network management device, such as a policy server (PS) 110, monitors data traffic through traffic class management devices, such as border routers 120, 130. Policy server 110 makes decisions about how individual traffic classes will be routed and stores this information in a routing control table, which is distributed and downloaded to each border router 120, 130 under the control of policy server 110.

Border routers 120,130 typically reside at the boundary of a LAN and a wide area network (WAN), and may perform ingress and egress filtering on traffic class. While only two border routers are illustrated in FIG. 1 for simplicity, multiple border routers may be deployed to optimize load sharing and improve failure tolerance. Packets are generally organized into traffic classes by examining the source and destination addresses together with the source and destination port numbers (according to protocol) of the packets.

One or more border routers 120,130 may receive traffic from one or more local area networks (LANs) of the datacenter/cloud 115, or from other border routers (not shown). In FIG. 1, in order to redirect a traffic class incoming to the first border router, also referred to as the "anchoring" border router, to a second border router, also referred to as the "forwarding" border router, a tunnel 140 is set up between the two border routers 120, 130, and traffic is forwarded based upon the routing control tables provided by policy server 110. The local area networks (LAN1, LAN2) are interfaces facing the inside of the cloud, and the wide area networks (WAN1, WAN2) are interfaces facing the network of the service provider (SP1, SP2). In this example, router (R3) 155 directs traffic inside of the service provider (SP1) 150 network and router (R4) 165 directs traffic inside of the service provider (SP2) 160 network.

The policy server 110 manages traffic class within a data center or cloud-based environment 115 by determining how individual traffic classes will be routed. For example, in FIG. 1, the policy server 110 monitors the performance characteristics of traffic classes and WAN exit link usage through WAN interfaces (WAN1, WAN2) reported by each border router (BR1, BR2) 120, 130 under its control. Based upon this information, the policy server 110 creates routing policies by making routing control decisions to optimize traffic class. The policy server then stores this information (i.e., routing paths) in a routing control table, which is downloaded to each border router 120, 130 under its control. For an individual traffic class, the policy server 110 may instruct a border router to redirect its packets to another border router for better overall network performance.

To effectively manage traffic class, the policy server 110 will need to adjust routing decisions periodically, by reconfiguring the routing control table and downloading updated policies to each border router 120, 130. For instance, a traffic class originally directed to a border router may need to be redirected to a different border router and if the policy server detects that the performance of a particular traffic class over a routing path drops below a pre-defined policy, causing an "Out Of Policy" error.

Figure 2:
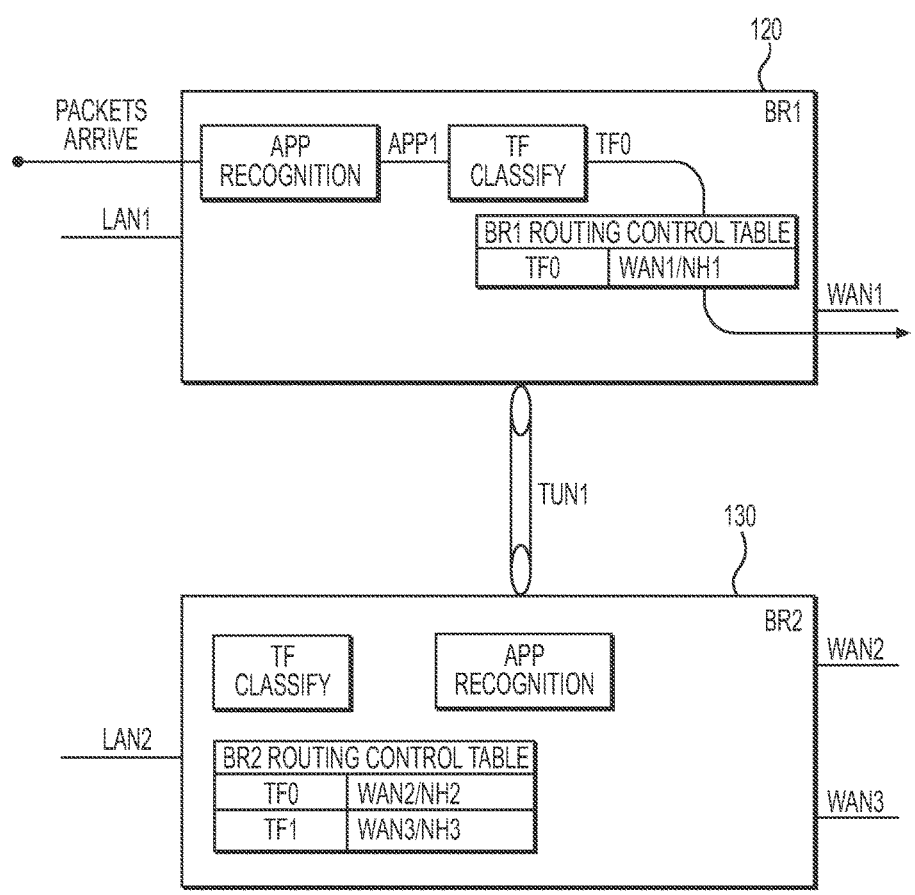
FIG. 2 illustrates an example traffic class through a border router based upon a routing control table.

Referring to FIG. 2, there is illustrated traffic class through a border router based upon a routing control table. One or more packets of a traffic class arrive from local area network at a border router and undergo application recognition and classification. Traffic classes may be classified based upon layer 3 and layer 4 information (L3/L4 information associated with the Open Systems Interconnection (OSI) model), as well as with software that performs application recognition, such as Network Based Application Recognition (NBAR). Based upon the instructions in the routing control table, the traffic class is forwarded along a designated route.

In particular, one or more packets arrive from LAN (LAN1), to undergo application recognition and traffic class classification and, in this example, become classified as traffic class (TF0) at border router (BR1) 120. Based upon the instructions provided by the routing control table, traffic class (TF0) is forwarded to nexthop (NH1) via wide area network exit link (WAN1). In this case, because border router (BR1) directly interfaces with wide area network exit link (WAN1), the traffic class does not need to undergo redirection (i.e., to be forwarded to any other border router, such as border router (BR2) 130) in order to be forwarded along a designated route.

Dual Border Router Environment

Figure 3:
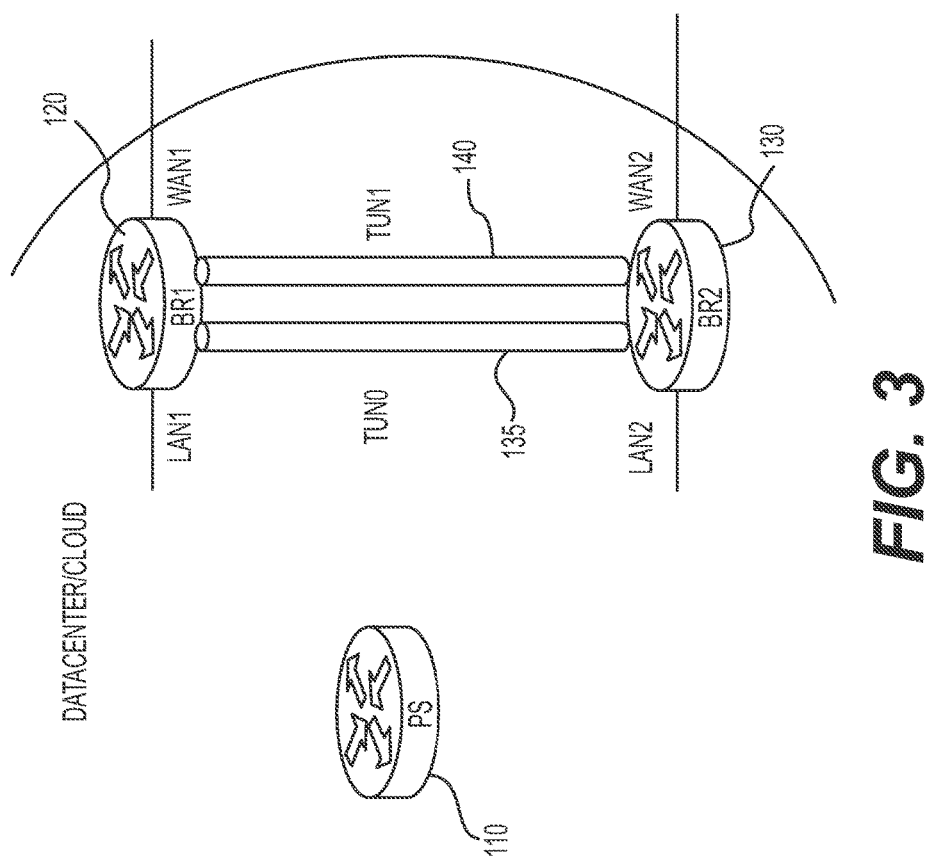
FIG. 3 illustrates an example implementation where a site includes two Border Routers controlled by Policy Server.

FIG. 3 illustrates an example implementation wherein a site includes two border routers (BR1 120 and BR2 130) that are controlled by, e.g., the Policy Server 110. As shown, LAN1/LAN2 are the border routers respective LAN interfaces, while WAN1/WAN2 are their respective WAN interfaces. Tun0 135 is a GRE tunnel used for redirection of LAN-to-WAN packets. Initially, the Policy Server instructs BR1 120 and BR2 130 to establish a tunnel there between, shown as Tun1 140. Tun1 140 is used for, e.g., redirection of WAN-to-LAN packets in accordance with the present disclosure.

In accordance with some implementations, a flow cache is leveraged. Application-aware services rely on the flow cache to maintain application flows, which are identified as a combination of source IP, source port, destination IP, destination port and protocol. In accordance with the present disclosure, two attribute flags may be attached to each application flow. One is "is_LSB" (i.e., is LAN-Side border router), and the other is "is_WSB" (i.e., is WAN-Side BR). Examples are shown in Table 1 and Table 2, below.

TABLE 1

| Value | Description |
|---|---|
| 1 | This border router is the LAN-side border router |
| −1 | This border router is not the LAN-side border router |
| 0 | It is undetermined if this border router is the LAN-side border router |

TABLE 2

| Value | Description |
|---|---|
| 1 | This border router is the WAN-side border router |
| −1 | This border router is not the WAN-side border router |

As show in Tables 1 and 2, the initial value of is_LSB may be 0 and is_WSB may be −1. The usage of these two flags is described below. For a particular application flow, it is possible that the WAN-Side border router may change in the middle of the flow because of the routing control of the remote site. The LAN-Side border router may be fixed, as it is related to load-sharing performed at the local site.

The example implementations below describe a dual border router scenario and the principles thereof will be expanded to N border routers (i.e., N>=2).

Application Flow Initiated from the Local Site

If an application flow is initiated from local site, the first packet is, thus, a LAN-to-WAN packet. Depending on the load-balance algorithm implemented by the preceding routers in LAN site, either one of the border routers (i.e., BR1 120 or BR2 130) may be a LAN-Side border router that receives the LAN-to-WAN packets of the application flow. In the following example description, BR1 120 is LAN-Side border router; however, the logic described below is the same no matter which border router is the LAN-Side border router.

Figure 4:
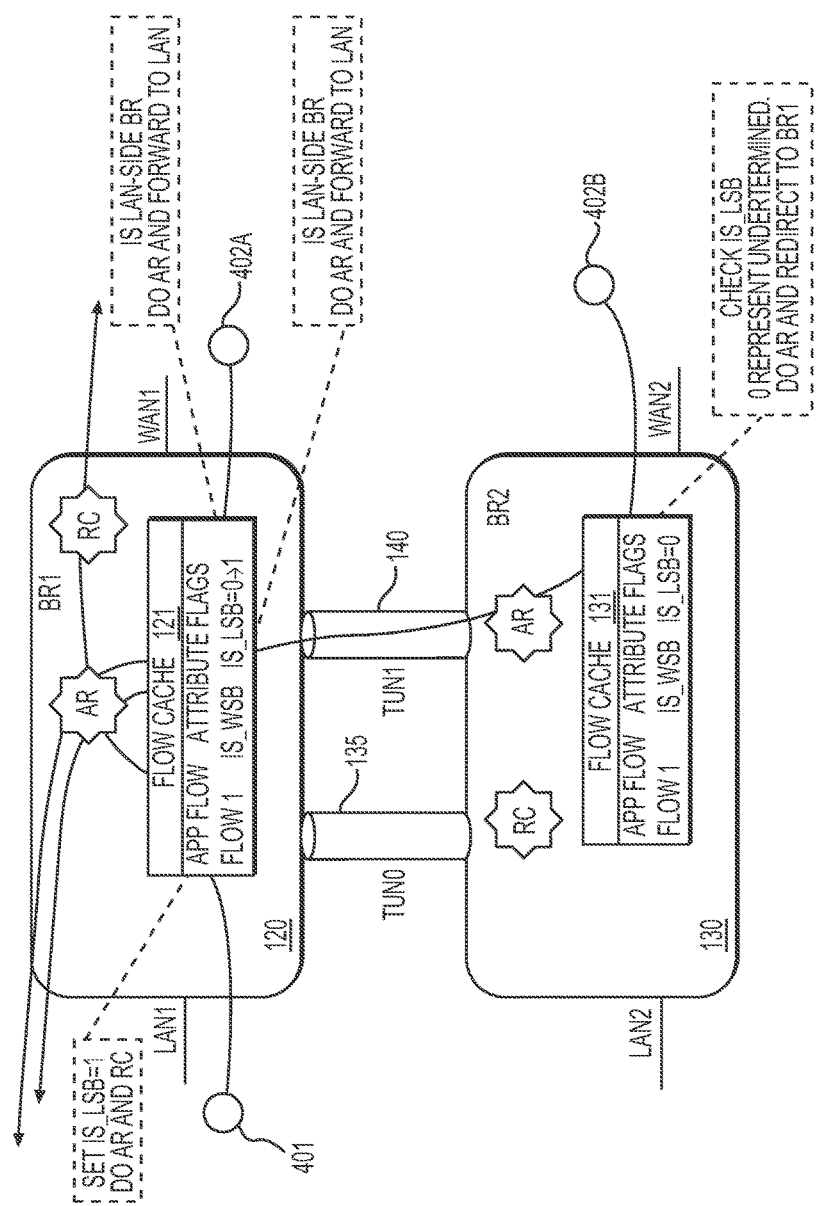
FIG. 4 illustrates a first example scenario of an application flow that is initiated from local site.

With reference to FIG. 4, there is illustrated a first example scenario of an application flow that is initiated from local site. The processing of the first packet (e.g., a TCP SYN packet) in path 401 begins with BR1 120 performing a look up in a flow cache 121, where it finds there is no existing flow. BR1 120 then creates a new flow by setting is_LSB to 1, as BR1 120 learns that it is the LAN-Side border router. As such, BR1 120 performs application recognition. The packet then goes out of WAN1 in accordance with BR1's routing control.

When the replying packet (e.g., a TCP SYN-ACK packet) is received from WAN-to-LAN, there are two possible paths, shown as 402a and 402b. In path 402a, the replying packet arrives on BR1's WAN1. Here, BR1 120 finds the existing flow in the flow cache 121 and checks is_LSB to find that BR1 120 is the LAN-Side border router. BR1 then performs application recognition and forwards the packet to the LAN using normal routing. In second path, 402b, the replying packet arrives at BR2's WAN2. Here, BR2 130 performs a look up in its flow cache 131, finds no existing flow, and creates a new flow. Because BR2 130 cannot determine that it is the LAN-Side border router, it performs application recognition and redirects the packet to BR1 120 through Tun1 140 to provide BR1 120 an opportunity to observe the packets. When BR1 120 receives the packet on Tun1 140, BR1 10 checks is_LSB and determines that it is the LAN-Side border router, so BR1 120 performs application recognition and forwards to incoming packet to the LAN.

Figure 5:
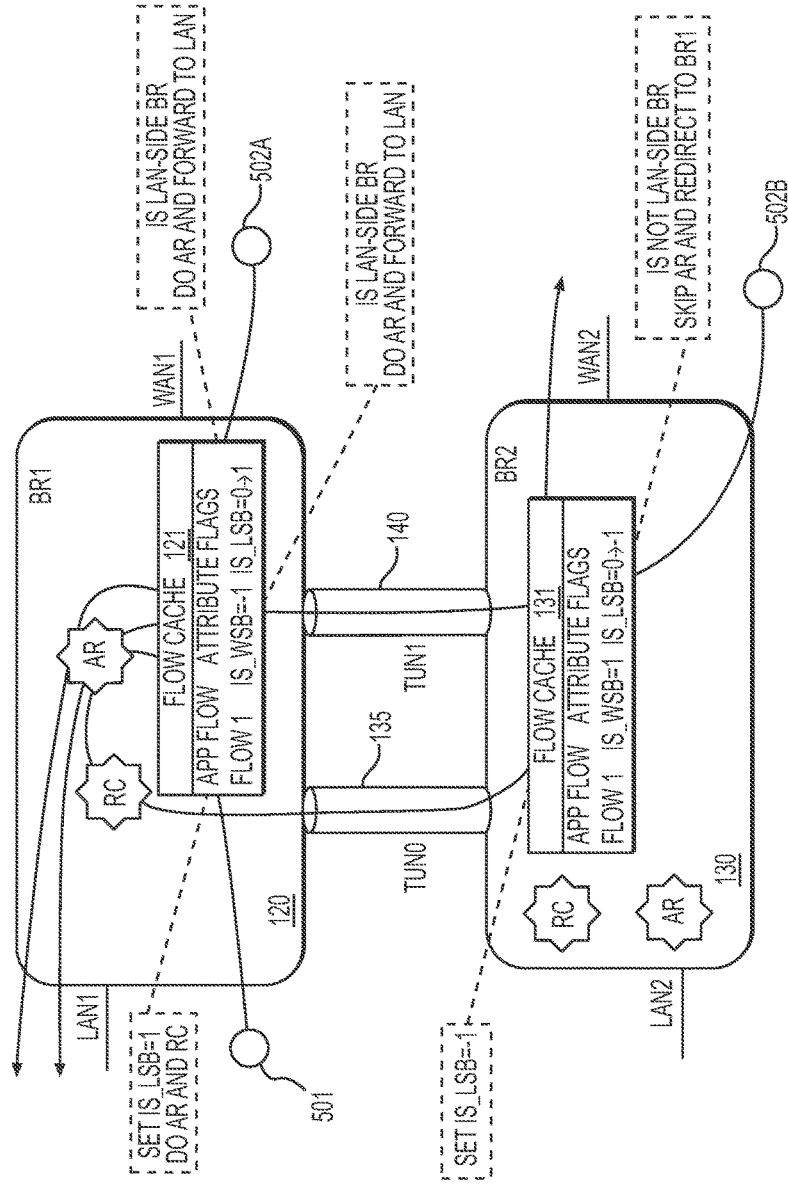
FIG. 5 illustrates a second example scenario of an application flow being initiated from local site.

With reference to FIG. 5, there is illustrated a second example scenario of an application flow being initiated from local site. The processing of the first packet (e.g., a TCP SYN packet) in path 501 begins with BR1 120 performing a look up in the flow cache 121, where it finds no existing flow. As such BR1 120 creates a new flow and sets is_LSB to 1, as it is the LAN-Side border router. BR1 120 then performs application recognition. Here, BR1's routing control chooses BR2's WAN2 as the outgoing interface for the packet, so the packet is redirected to BR2 through Tun0 135. When the packet is received at BR2 130, it performs a look up in the flow cache 131 for the received redirected packet, where it also finds no existing flow. As such BR2 130 creates a new flow and sets is_LSB to -1 because receiving the redirected packet from Tun0 135 is an indication to BR2 130 that it is not the LAN-Side border router. The packet then sent out of BR2's WAN2.

For the replying packet (e.g., a TCP SYN-ACK packet) from WAN-to-LAN, there are two possible paths 502a and 502b. In path 502a, the replying packet arrives at BR1's WAN1. Here, BR1 120 finds the existing flow and checks is_LSB to determine that it is LAN-Side border router. Accordingly, BR1 120 performs application recognition and the packet is forwarded to the LAN. In the second path, 502b, the replying packet arrives at BR2's WAN2. BR2 130 finds the exiting flow in the flow cache and checks is_LSB to determine that it is not the LAN-Side border router. As such, BR2 130 skips application recognition and redirects the packet to BR1 through Tun1 140 to provide BR1 120 an opportunity to observe the packet. When BR1 120 receives the packet on Tun1 140 it checks the is_LSB to find that it is the LAN-Side BR, so it performs application recognition and forwards the packet to the LAN.

Application Flow Initiated from the Remote Site

Figure 6:
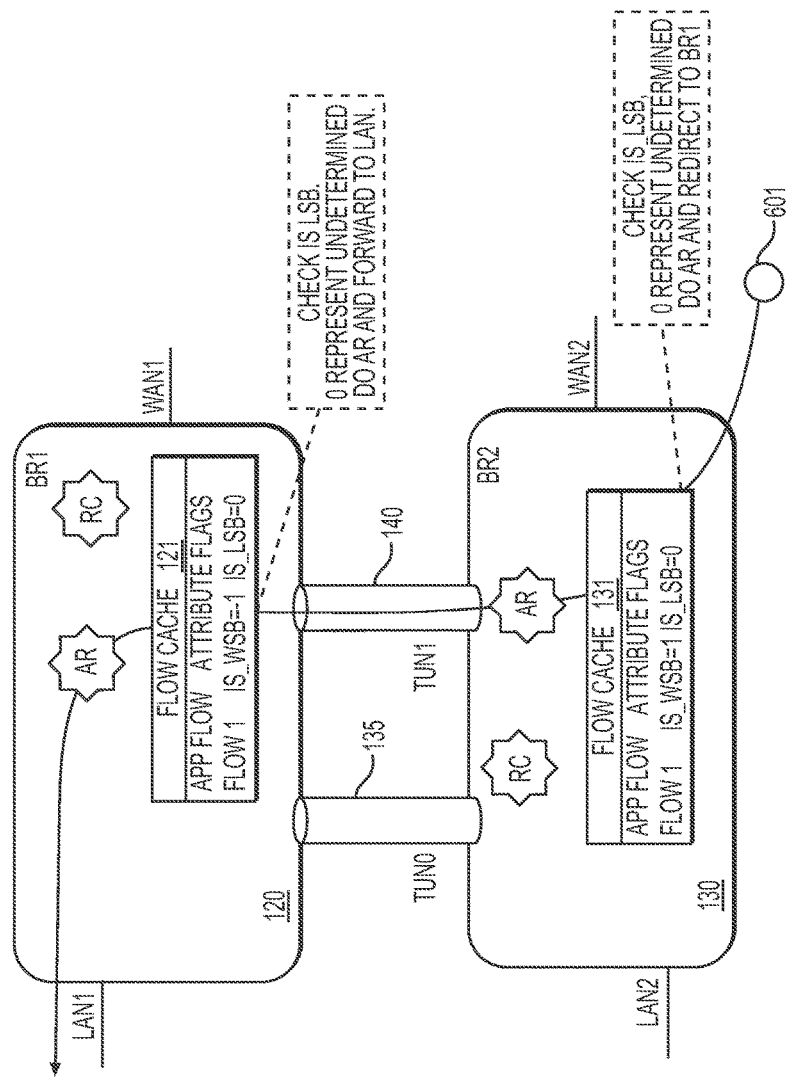
FIG. 6 illustrates example processing of a first packet of the application flow that is initiated from a remote site.

If the application flow is initiated from the remote site, the first packet is a WAN-to-LAN packet. FIG. 6 illustrates example processing of a first packet of the application flow that is initiated from a remote site. In FIG. 6, the first packet (e.g. a TCP SYN packet) of the application flow comes in from the WAN side. The packet may arrive on either BR1 or BR2's WAN interface. For non-limiting purposes of illustration, the packet is described as arriving at BR2 130. Initially, BR2 130 performs a look up in the flow cache 131 and finds no existing flow. As such, BR2 130 so creates a new flow. However, BR2 130 cannot yet determine whether it is LAN-Side BR, so it performs application recognition and redirects the packet to BR1 120 through Tun1 140 to provide BR1 120 an opportunity to observe the packet. When BR1 120 receives the packet on Tun1 140, it performs a look up in flow cache 121 and also finds no exiting flow. Accordingly, BR1 120 then creates a new flow. Here again, BR1 120 cannot determine whether it is LAN-Side BR, so it also performs application recognition. Thereafter, because BR1 120 received the packet from BR2 130, it is not redirected the BR2 130, rather the packet is forwarded to the LAN.

Figure 7:
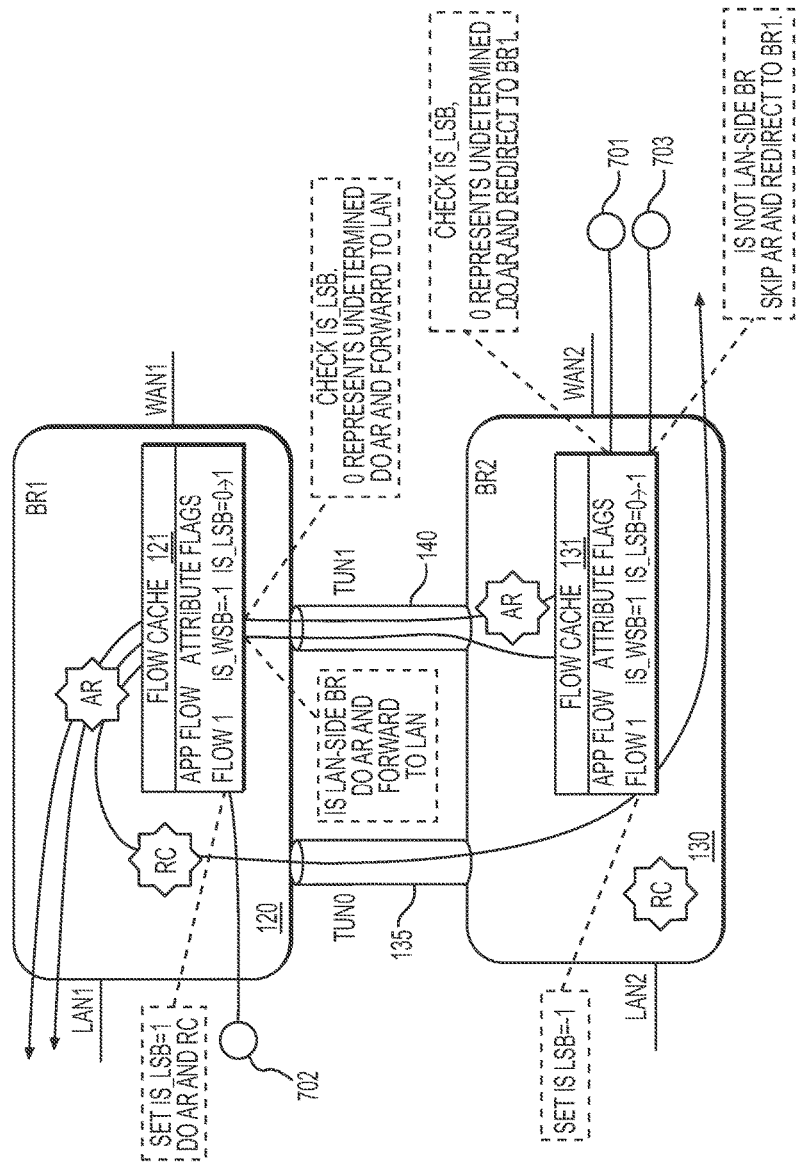
FIG. 7 is another example scenario of an application flow that is initiated from the remote site.

Another example scenario of application flow being initiated from remote site will now be provided. Except the first packet (as described above), the subsequent packets go through the same process as the counterparts in the scenario of application flow being initiated from local site. FIG. 7 is another example scenario of scenario of application flow that is initiated from the remote site. Processing of first packet is performed as described with reference to FIG. 6.

When the second packet arrives (e.g. a TCP SYN-ACK packet), BR1 120 finds the existing flow in the flow cache 121 and sets is_LSB to 1, as BR1 120 is the LAN-Side border router. BR1 120 performs application recognition and, e.g., BR1's routing control chooses BR2's WAN2 as the outgoing interface for the packet. As such, the packet is redirected to BR2 130 through Tun0. BR2 130 finds the existing flow in the flow cache and sets is_LSB to -1 because receiving the redirected packet from Tun0 triggers BR2 130 to realize it is not the LAN-Side border router. The packet the goes out of BR2's WAN2.

For the third packet (e.g. TCP ACK), BR2 130 finds the existing flow and checks is_LSB to find that it is not the LAN-Side border router. As such, BR2 130 skips application recognition and redirects the packet to BR1 120 through Tun1 140. BR1 120 finds the existing flow and checks is_LSB to find that it is the LAN-Side BR, so BR1 120 performs application recognition and forwards the packet to LAN. Otherwise, if the second packet is received on BR2's LAN2, then BR2 130 will be the LAN-side BR, and the received third packet from WAN2 will be forwarded to LAN2 without redirection.

Figure 8:
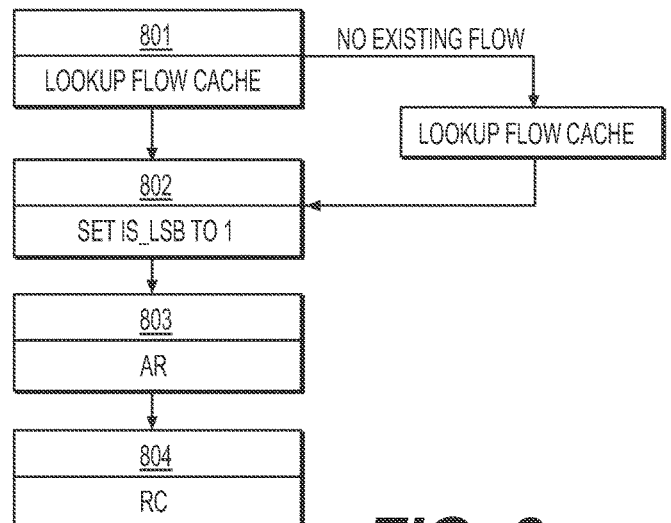
FIG. 8 illustrates an example operational procedure performed on packets received on LAN interface.

Above, FIGS. 3-7 describe the example scenarios in which principles of the present disclosure may be used. In accordance with the example scenarios, FIGS. 8-11 illustrate example operation flow diagrams that implement the logic of the example scenarios. FIG. 8 describes an example operational procedure performed on packets received on LAN interface. At 801, a lookup is performed of the flow cache for an existing application flow for the packet, if none then a new application flow is created. For example, BR1 120 may perform the look up of flow cache 121. At 802, the application flow's is_LSB flag is set to 1, as the router is the LAN-Side border router for this particular application flow. For example, BR1 120 may be the LAN-Side border router. At 803, application recognition is performed. At 804, routing control is performed. Operations at 803 may be performed by, e.g., BR1 120.

Figure 9:
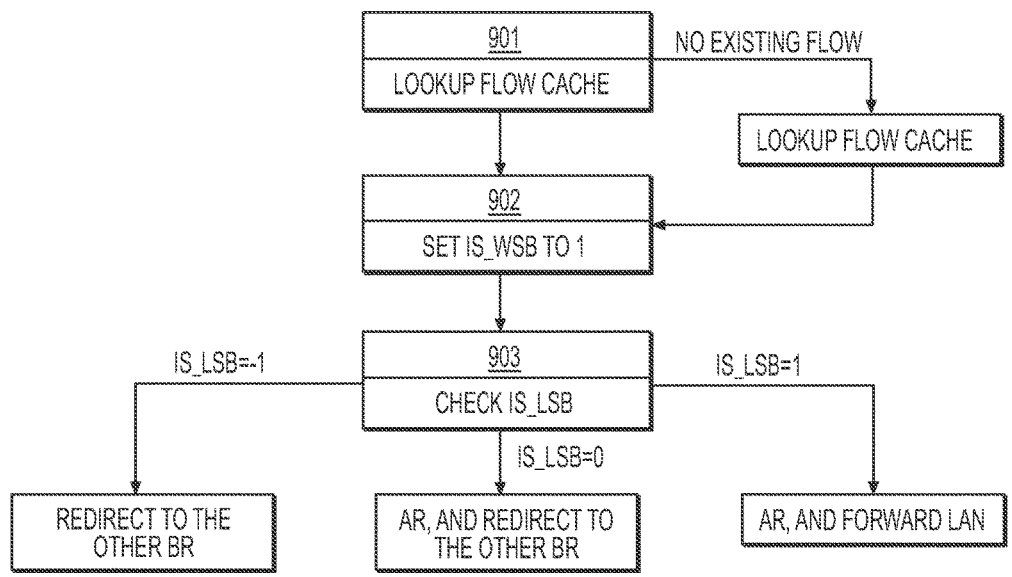
FIG. 9 illustrates an example operation flow performed on packets received on WAN interface.

FIG. 9 illustrates an example operation flow performed on packets received on WAN interface. At 901, a lookup is performed of the flow cache for an existing application flow for the packet, if none then a new application flow is created. For example, BR1 120 may perform the look up of flow cache 121. At 902, the application flow's is_WSB flag is set to 1, as the router is the WAN-Side border router for the particular application flow. For example, BR1 120 may be the WAN-Side border router. At 903, is_LSB flag of the application flow is checked and if is_LSB=1, then the router (e.g., BR1 120) is the LAN-Side BR, so it performs application recognition and forwards the packet out of LAN interface. If is_LSB=-1, then the router (e.g., BR1 120) is not the LAN-Side BR, application recognition is skipped, and the packet is redirected to the other border router through Tun1 140. If is_LSB=0, the determination is that the router (e.g., BR1 120) is the LAN-Side border router made, then application recognition is performed and the packet is redirected to the other border router through Tun1 140.

Figure 10:
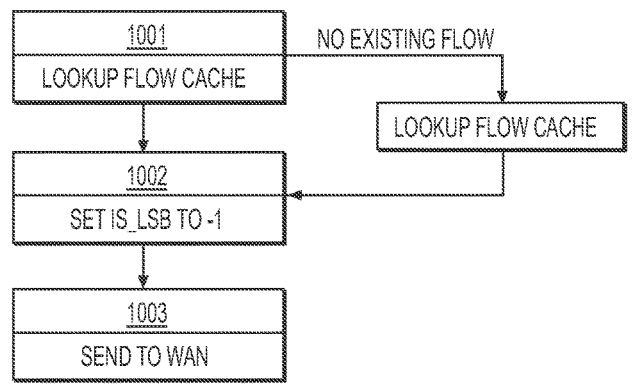
FIG. 10 illustrates an example operational flow performed on packets received on a tunnel interface.

FIG. 10 illustrates an example operational flow performed on packets received on the Tun0 135 interface. At 1001, a lookup of the flow cache is performed for an existing application flow for the packet, if none if found then a new application flow is created. For example, BR1 120 may perform the look up of flow cache 121. At 1002, the application flow's is_LSB flag is set to -1. As noted above, Tun0 135 is for redirection of LAN-to-WAN packets, thus receiving packets from Tun0 135 implies that the other border router received the packet on the LAN and performed routing control, which results in the packet redirected to the router performing the operations of FIG. 11 (e.g., BR1 120). It can be deduced that the router BR1 120 is not the LAN-Side border router and the other border router (e.g., BR2 130) is the LAN-Side border router. At 1003, the packet is sent out of the WAN.

Figure 11:
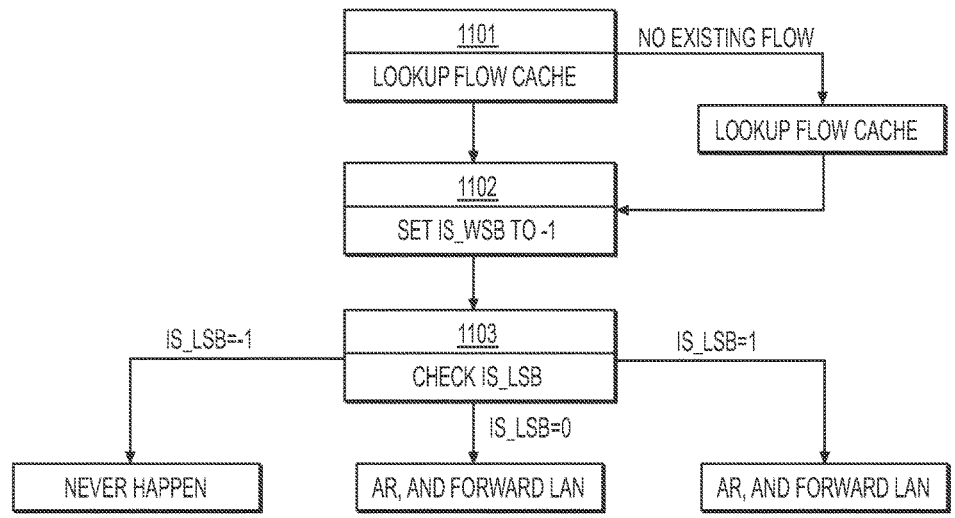
FIG. 11 illustrates an example operational flow performed on packets received on Tun1 interface.

FIG. 11 illustrates an example operational flow performed on packets received on Tun1 interface. At 1101, a lookup the flow cache is performed for an existing application flow for the packet, and if none exists, then a new application flow is created. For example, BR1 120 may perform the look up of flow cache 121. At 1102, the application flow's is_WSB flag is set to −1, as this router (e.g., BR1 120) is not the WAN-Side border router for this particular application flow at this moment. At 1103, is_LSB flag of this application flow is checked, and if is_LSB=1, then the router is determined to be the LAN-Side border router. For example, the router BR1 120 performs application recognition and forwards the packet out of LAN interface. If is_LSB=0, it has not been determined if the router is LAN-Side border router. Application recognition is then performed. Because this router (e.g., BR1 120) receives the packet from redirection, it does not redirect the packet, so the packet is forward out of the LAN interface. If is_LSB=−1, this indicates that the router (e.g., BR1 120) is not LAN-Side border router. In accordance with the present disclosure, this scenario does not occur, because if is_LSB is equal to −1, then the other border router must be the LAN-Side border router. However, under this condition, the other border router would not have redirected this WAN-to-LAN packet to this router.

It is noted that in the above operational flows, BR1 120 was provided as an example border router performing the various operations. It is note that BR2 130 may provide such functions, as the selection of BR1 120 was for illustrative purposes only. As described, the LAN-Side border router observes all packets of an application in both directions both before and after it learns it is the LAN-Side BR, thus the AR's issue of asymmetric flow is resolved.

Multiple Border Routers (N BRs)

Figure 12:
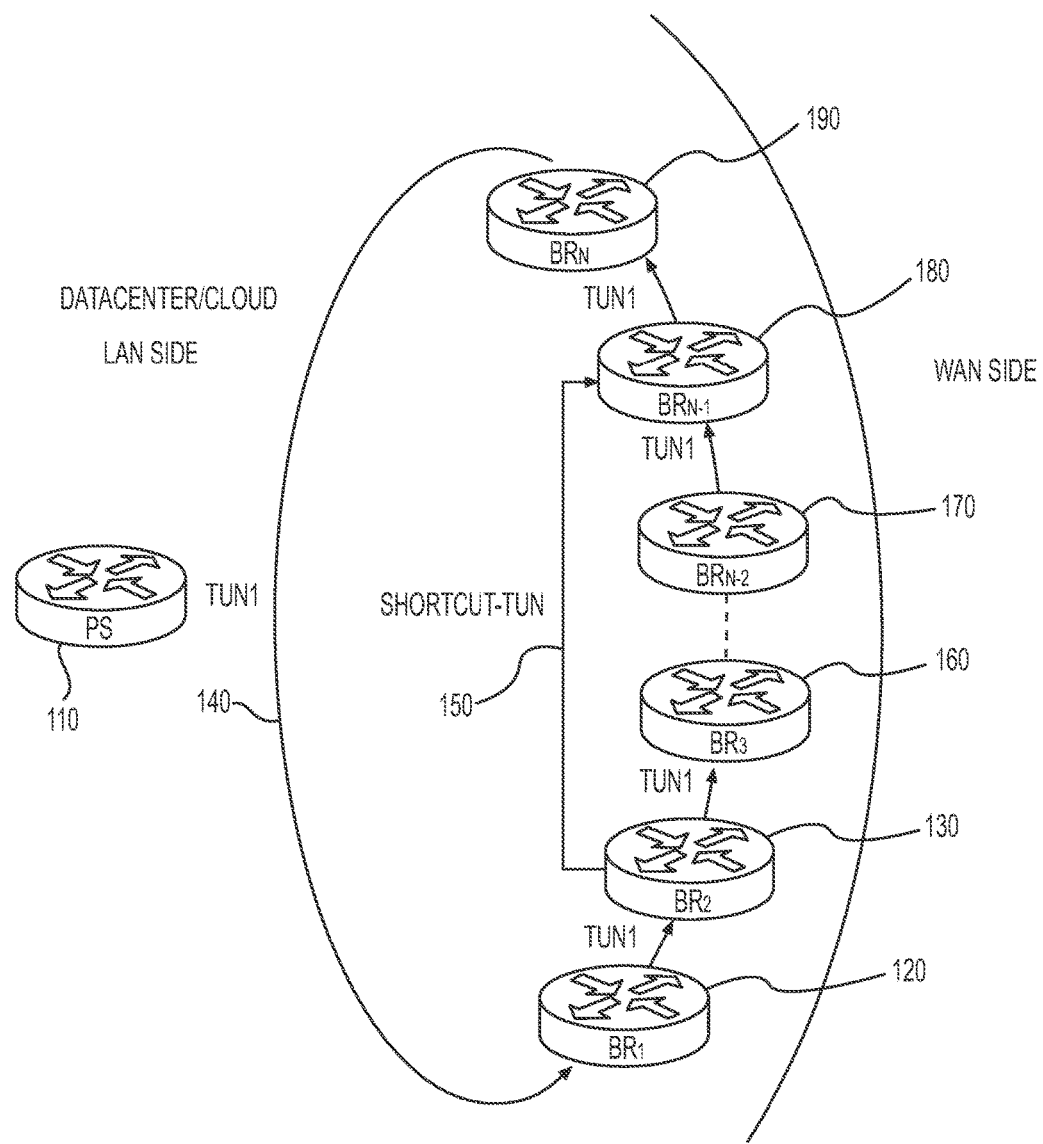
FIG. 12 illustrates a site having N border routers controlled by a Policy Server.

FIG. 12 illustrates a site having N BRs (120, 130, 160, 170, 180, 190) controlled by the Policy Server 110. As shown, LAN1, LAN2 . . . LANn are the border router's respective LAN interfaces while WAN1, WAN2 . . . WANn are the respective WAN interfaces. As shown, Tun1 140 between the border routers is a series of tunnels used for redirection of LAN-to-WAN packets. Tun1 140 in the N BRs scenario is a point-to-multipoint GRE tunnel, which forms a full-meshed interconnection among all the border routers 120, 130, 160, 170, 180, 190.

Initially, the Policy Server 110 constructs a circular ordered list including all the border routers 120, 130, 160, 170, 180, 190, e.g. BR1→BR2→BR3→BR4→ . . . → BRn→BR1. This list is downloaded from the Policy Server 110 to all the border routers 120, 130, 160, 170, 180, 190. Each border router then establishes a tunnel to its downstream BR, e.g. BR3 160 sets up a downstream tunnel to BR$_{n-2}$ 170 while BR$_n$ sets-up a downstream tunnel to BR1 120. For purposes of simplicity, all of the tunnels are labeled Tun1 140. As noted above, Tun1 140 is used to redirect WAN-to-LAN packets between border routers, where in the N border routers scenario; the direction of packets redirection through Tun1 140 follows the circular ordered list. In addition to Tun1, a "Shortcut-Tun" (S-Tun) 150 is introduced into the N border routers scenario.

In accordance with the present disclosure, S-Tun 150 is dynamically associated with an application flow to form a shortcut from WAN-side border router to LAN-side border router to bypass the intermediate border routers in the ordered list. At the beginning of an application flow, WAN-to-LAN packets are redirected by following the ordered list through Tun1 140 starting from WAN-Side border router till either the packets arrives the LAN side border router (i.e., hits an existing flow) or the packets have gone through all the border routers in the circular ordered list (i.e., a new flow setup from WAN side). The packets are then forwarded to the LAN. Once the first WAN-to-LAN packet arrives at the LAN-Side border router through Tun1, the flow association with the S-Tun 150 is set. When the shortcut is ready, all the subsequent WAN-to-LAN packets are directly redirected through S-Tun 150 from WAN-Side border router to LAN-Side border router, skipping all the unnecessary processing in the intermediate border routers. Thus, the use of S-Tun 150 eliminates unnecessary flows in the flow caches of intermediate border routers, which are quickly expired and deleted to save resources. The WAN-to-LAN packets skip all intermediate border routers to greatly shorten the processing time.

In accordance with above, the TTL field in Tun1's tunnel header is used to track the "cursor" in the circular ordered list during the packet redirection through Tun1 140. The TTL is initialized with a predefined value by WAN-Side border router, and is decremented by one every time the redirected packet passes through one border router following the circular ordered list. On the LAN-Side border router, the TTL is used in Tun1's tunnel header to locate the WAN-side border router in the circular ordered list so as to associate S-Tun 150 with respective application flows. The WAN-Side border router is located by checking the TTL to decide how many hops from WAN-side border router to LAN-side border router in the ordered list. At the same time, the TTL is also utilized to decide if a packet has gone through all the border routers in the circular ordered list during WAN-to-LAN packets redirection through Tun1 140. The utilization of the TTL has a precondition, which is that each border router be adjacent to its downstream border router (i.e., in the same Layer 3 subnet). In case the precondition cannot be met, a GRE key in Tun1's GRE header is used in place of TTL; however, the logic remains the same as if the TTL value is stored in GRE key field. For the simplicity of description in the following, the TTL refers to the value stored in the TTL field or the GRE key field.

Packets Received on LAN Interface

Figure 13:
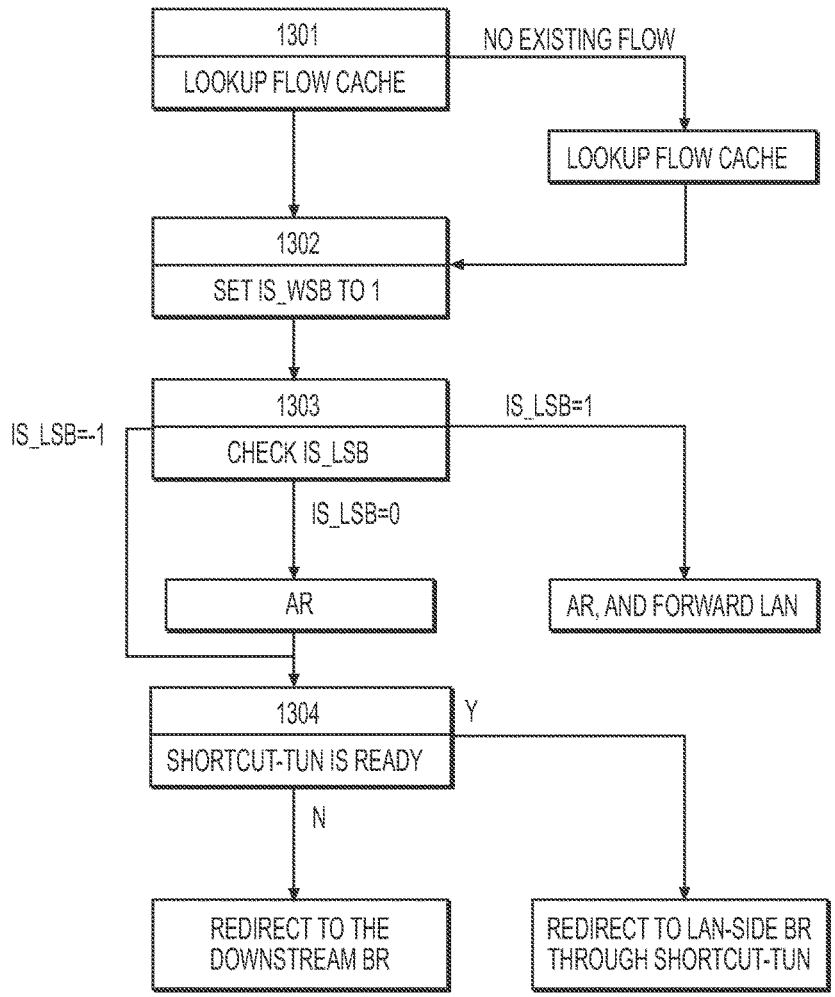
FIG. 13 illustrates an example operational flow of operations performed on packets received on WAN interface.

FIG. 13 illustrates an example operational flow of operations performed on packets received on WAN interface. At 1301, a lookup is performed on the flow cache for an existing application flow for the packet, and if none is found a new application flow is created. At 1032, the application flow's is_WSB flag is set to 1, as this router (e.g., BR1 120) is the WAN-Side border router for this particular application flow. At 1303, the is_LSB flag of this application flow is checked, and if is_LSB=1, then the router (e.g., BR1 120) is the LAN-Side border router. Application recognition is performed and the packet is forwarded out of the LAN interface. If is_LSB=−1, then the router (e.g., BR1 120) is not the LAN-Side border router. Application recognition is skipped and the process flows to 1304. If is_LSB=0, then it has not been determined whether the router (e.g., BR1 120) is the LAN-Side border router. Application recognition is performed and the process flows to 1304. At 1304, the packet is redirected to the LAN-Side border router either using the Shortcut-Tun 150 if it has been established for this application flow, or the packet is sent to the downstream border router through Tun1 140 if the S-Tun 150 has not yet been established with the TTL in tunnel header set to a predefined value (e.g. 255).

Figure 14:
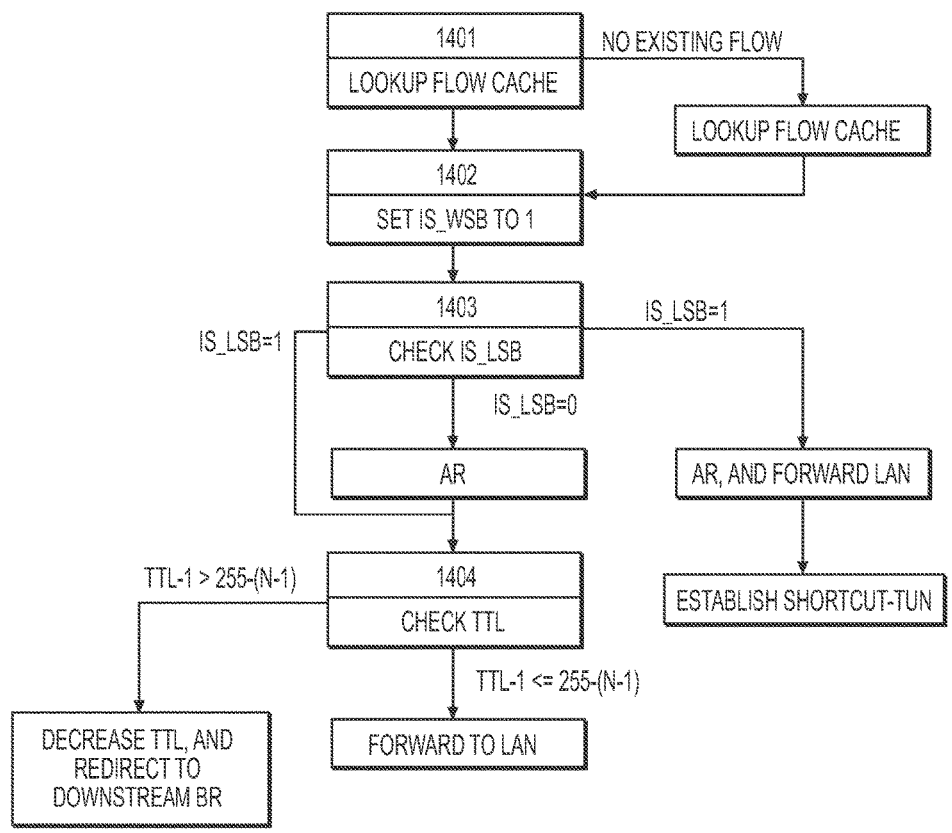
FIG. 14 illustrates an operational flow performed on packets received on Tun1 interface.

FIG. 14 illustrates an operational flow performed on packets received on Tun1 interface. At 1401, a lookup is performed of the flow cache for an existing application flow for the packet, if none is found then a new application flow is created. This may be performed by, e.g., BR1 120. At 1402, the application flow's is_WSB flag is set to −1, as this router (e.g., BR1 120) learns that it is not the WAN-Side border router for this particular application flow at this moment. At 1403, the is_LSB flag of this application flow is checked, and if is_LSB=1, then the router (e.g., BR1 120) is the LAN-Side border router. Application recognition is performed and the packet is forward out of LAN interface. Here also, the router (e.g., BR1 120) determines that it is the LAN-Side BR, while another border router (e.g., BR2 130 or other) is the WAN-Side border router. Moreover, the Shortcut-Tun 150 does not yet exist because otherwise the packet would have been received from Shortcut-Tun 150 instead of Tun1 140. As such, the Shortcut-Tun 150 from the WAN-Side border router to this router (i.e. the LAN-Side border router) is established. If is_LSB=−1, then this router (e.g., BR1 120) is not the LAN-Side border router. Application recognition is skipped and the process continues to 1404. If is_LSB=0, then it has not been determined whether the router (e.g., BR1 120) is the LAN-Side border router. As such, application recognition is performed and the process flows to 1404.

At 1404, the packet about to be redirected to the downstream border router. Prior to redirecting, a check is performed to see whether this router (e.g., BR1 120) is the last border router in this redirection path by comparing the result of 255-(N−2) with the TTL retrieved from Tun1's tunnel header. If the former value is equal to the later one, then the packet has gone through all the border routers in the circular ordered list, but failed to find the LAN-Side border router. This may occur when a new application flow is setup from WAN and the LAN-Side border router for this flow has not been determined yet. In this case the packet is forwarded out of LAN interface. If the former value is less than the later one, then there is still at least one border router left to which the packet may be redirected. As such, the TTL is decremented by one. The packet is then redirected to the downstream border router through Tun1 140, with TTL in the tunnel header populated with the decremented value.

It is noted that in the above operational flows in FIGS. 13 and 14, BR1 120 was provided as an example border router performing the various operations. It is note that any of the border routers 120, 130, 160, 170, 180, 190 may provide such functions, as the selection of BR1 120 was for illustrative purposes only. Additional examples of packet processing may include packets received on the Tun1 interface and packets received on the Shortcut-Tun interface. In the former example, processing is the same as with the counterpart in dual border router scenario, described above. In the later, only the LAN-Side border router can receive redirected packets from the Shortcut-Tun 150. Accordingly, application recognition is performed and the packet is forwarded out of the LAN. Thus, in an N border routers scenario, the operational flows above in FIGS. 13 and 14 assure that the LAN-Side border router is able to observe all packets of an application flow from both directions.

Figure 15:
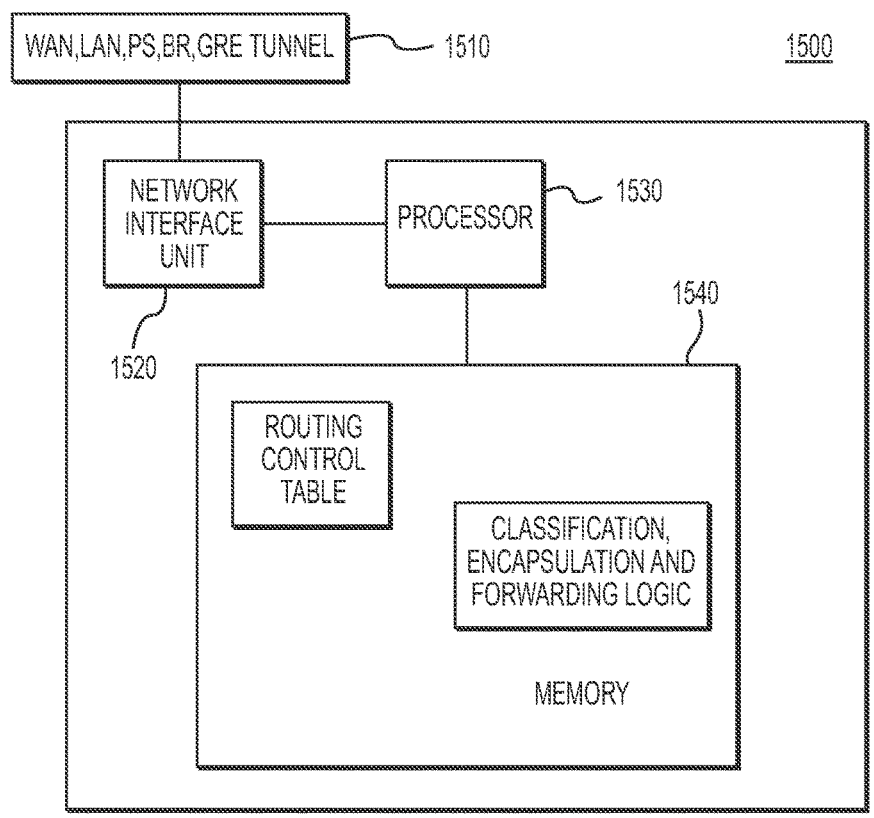
FIG. 15 is a hardware implementation of a border router according to the techniques disclosed herein.

FIG. 15 is a hardware implementation 1500 of a border router according to the techniques disclosed herein. A network interface card 1520 interfaces with a network. A processor 1530 executes the application recognition, classification, encapsulation and forwarding software according to the techniques disclosed herein. Routing control tables are stored in memory 1540. Various interfaces 1510 to which the network interface unit 1520 is connected are shown. Such interfaces include LANs, WANs, policy server 110, other border routers, GRE tunnels 140 and Shortcut-Tun 150. Thus, while conceptually illustrated as a "network interface unit," it will be appreciated that a border router may contain more than one network interface or type of interface to communicate with other devices within the network.

Memory 1540 is one or more computer readable storage media that may comprise read only memory (ROM), random access memory (RAM), magnetic disk storage media devices, optical storage media devices, flash memory devices, electrical, optical, or other physical/tangible memory storage devices. Processor 1530 is, for example, a microprocessor or microcontroller that executes instructions implementing the example operational flows above. Thus, in general, the memory 1540 may comprise one or more tangible computer readable storage media (e.g., a memory device) encoded with software comprising computer executable instructions and when the software is executed (by the processor 1530) it is operable to perform the example operational flows above. In other approaches, the flow cache and the routing control table are stored in one or more databases accessible by processor 1530.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method of operating a plurality of border routers, including a first border router and a second border router, to asymmetrically observe packets of an application flow from both a LAN and a WAN-originating direction of packet traffic, the method comprising:

maintaining, in a flow cache at a first border router, a first application flow associated with one or more first packets received at the first border router from a LAN-originated direction of packet traffic, wherein the flow cache at the first border router comprises one or more attribute values to identify whether the first border router is a LAN-side border router or a WAN-side border router with respect to the first application flow;

upon receipt of a second packet at the first border router and determining that the received second packet is associated with a WAN-originated direction of packet traffic, determining, at the first border router, whether the received second packet is associated with an existing application flow in the flow cache of the first border router;

wherein, in response to determining that the received second packet is associated with the first application flow in the flow cache of the first border router, sending the received second packet from the first border router to a LAN-destination device associated with the LAN-originated direction; and wherein, in response to determining that the received second packet is not associated with an existing application flow in the flow cache of the first border router, forwarding the received second packet from the first border router to the second border router over a tunnel interface, wherein the second border router is configured to send the received second packet to the LAN-destination device upon a determination that the received second packet comprises, in a second flow cache maintained at the second border router, an association with the first application flow;

setting a first attribute flag in the flow cache of the first border router when a first packet of the one or more first packets is received at a Local Area Network (LAN) interface of the first border router, wherein the first attribute flag identifies whether the first border router is a LAN-side border router; and setting a second attribute flag in the flow cache of the first border router when the second packet is received at a Wide-Area Network (WAN) interface of the first border router, wherein the second attribute flag identifies whether the first border router is a WAN-side border router.

2. The method of claim 1, comprising:

setting the first attribute flag in the flow cache of the first border router when a third packet is received at the tunnel interface of the first border router, wherein the first attribute flag identifies that the first border router is not a LAN-side border router; and sending the received third packet to a Wide-Area Network (WAN) interface of the first border router.

3. The method of claim 1, comprising:

setting the second attribute flag in the flow cache of the first border router when a third packet is received at a second tunnel interface of the first border router, wherein the first attribute flag identifies that the first border router is not a LAN-side border router; and upon a determination that the received third packet is a border router, forwarding the third packet to the LAN-destination device.

4. The method of claim 1, further comprising:

receiving a subsequent packet at a WAN interface of the first border router;

determining that the subsequent packet is associated with an application flow in a flow cache of the first border router;

determining that the first border router is the border router associated with a LAN interface; and forwarding the subsequent packet to the LAN-destination device via the LAN interface of the first border router.

5. The method of claim 1, further comprising:

receiving, at the second border router, a subsequent packet at a WAN interface of the second border device;

determining, at the second border router, that the subsequent packet is not associated with an application flow in a flow cache of the second border router; and forwarding the subsequent packet from the second border router to the first border router via the tunnel interface.

6. The method of claim 1, further comprising establishing a shortcut tunnel for an application flow between the first border router and a downstream border router, the shortcut tunnel bypassing a circular ordered list of tunnels between plural border routers.

7. The method of claim 6, further comprising examining a Time to Live (TTL) field in a packet header field associated with the circular ordered list of tunnels to determine packet redirection.

8. The method of claim 7, further comprising decrementing the TTL field each time the packet passes through border routers associated with the circular ordered list of tunnels.

9. The method of claim 8, further comprising determining if the TTL field is a predetermined value, and if so, forwarding the packet to a LAN.

10. An apparatus, comprising:

a network interface unit configured to communicate over a LAN interface, a WAN interface, and a tunnel interface of a first border router;

a processor coupled to the network interface unit; and a memory having instructions stored thereon, wherein execution of the instructions, cause the processor to:

maintain, in a flow cache, for a first application flow associated with one or more first packets received at the LAN interface, wherein the flow cache at the first border router comprises one or more attribute values to identify whether the first border router is a LAN-side border router or a WAN-side border router with respect to the first application flow;

in response to receipt of a second packet at the WAN interface, determine whether the received second packet is associated with an existing application flow in the flow cache;

set a second attribute flag in the flow cache when the second packet is received at the WAN interface, wherein the second attribute flag identifies whether the apparatus is a WAN-side border router;

in response to determining that the received second packet is associated with the first application flow in the flow cache, send the received second packet to a LAN-destination device associated with the LAN interface; and in response to determining that the received second packet is not associated with an existing application flow in the flow cache, forward the received second packet to a second border router over the tunnel interface, wherein the second border router is configured to send the second packet to the LAN-destination device upon a determination that the received second packet comprises, in a second flow cache maintained at the second border router, an association with the first application flow.

11. The apparatus of claim 10, wherein the instructions, when executed by the processor, cause the processor to set a first attribute flag in the flow cache when a first packet of the one or more first packets is received at the LAN interface, wherein the attribute flag identifies whether the apparatus is associated with a LAN-side border router.

12. The apparatus of claim 10, wherein the instructions, when executed by the processor, cause the processor to:

set a first attribute flag in the flow cache when a third packet is received over the tunnel, wherein the first attribute flag identifies that the apparatus is not a LAN-side border router; and forward the received third packet to the WAN interface.

13. The apparatus of claim 10, wherein the instructions, when executed by the processor cause the processor to:

receive a subsequent packet associated with the WAN interface; and upon determining that the subsequent packet is associated with an application flow in the flow cache having an association with the LAN interface, forward the subsequent packet to a destination device over the LAN interface.

14. One or more non-transitory computer readable storage media encoded with software comprising computer executable instructions and when the software is executed operable to:

maintain, in a flow cache, for a first application flow associated with one or more first packets received at the LAN interface, wherein the flow cache at the first border router comprises one or more attribute values to identify whether the first border router is a LAN-side border router or a WAN-side border router with respect to the first application flow;

in response to receipt of a second packet at a WAN interface, determine whether the received second packet is associated with an existing application flow in the flow cache;

set a second attribute flag in the flow cache when the second packet is received at the WAN interface, wherein the second attribute flag identifies whether the apparatus is a WAN-side border router;

in response to determining that the received second packet is associated with the first application flow in the flow cache, (i) set a first attribute flag in the flow cache when the second packet is received at the LAN interface, wherein the attribute flag identifies whether the apparatus is associated with a LAN-side border router and (ii) send the received second packet to a LAN-destination device associated with the LAN interface; and in response to determining that the received second packet is not associated with an existing application flow in the flow cache, forward the received second packet to a second border router over a tunnel interface, wherein the second border router is configured to send the second packet to the LAN-destination device upon a determination that the received second packet comprises, in a second flow cache maintained at the second border router, an association with the first application flow.

15. The method of claim 1, wherein the first application flow comprises a source IP address, a source port, a destination IP address, a destination port, and a protocol.

16. The apparatus of claim 10, wherein the first application flow comprises a source IP address, a source port, a destination IP address, a destination port, and a protocol.

17. The apparatus of claim 10, wherein the instruction, when executed by the processor, further cause the processor to:

establish a shortcut tunnel for an application flow between the first border router and a downstream border router, wherein the shortcut tunnel bypasses a circular ordered list of tunnels between plural border routers.

18. The apparatus of claim 10, wherein the instruction, when executed by the processor, further cause the processor to:

examine a Time to Live (TTL) field in a packet header field associated with the circular ordered list of tunnels to determine packet redirection.

19. The apparatus of claim 18, wherein the instruction, when executed by the processor, further cause the processor to:

decrement the TTL field each time the packet passes through border routers associated with the circular ordered list of tunnels.

20. The apparatus of claim 19, wherein the instruction, when executed by the processor, further cause the processor to:

determine if the TTL field is a predetermined value, and if so, forward the packet to a LAN.

* * * * *